United States Patent [19]

Champoux

[11] 4,197,782

[45] Apr. 15, 1980

[54] LOCKBOLT JOINT AND METHOD OF MAKING A LOCKBOLT JOINT

[75] Inventor: Louis A. Champoux, Seattle, Wash.

[73] Assignee: The Boeing Company, Seattle, Wash.

[21] Appl. No.: 936,066

[22] Filed: Aug. 23, 1978

Related U.S. Application Data

[63] Continuation of Ser. No. 614,774, Sep. 19, 1975, abandoned, which is a continuation of Ser. No. 480,840, Jun. 19, 1974, abandoned.

[51] Int. Cl.² .............................................. F16B 19/02
[52] U.S. Cl. ........................................... 85/7; 29/506
[58] Field of Search ........................ 85/7, 5 R, 8.6, 77, 85/78, 50 R; 29/506, 508, 517, 526; 403/408

[56] References Cited

U.S. PATENT DOCUMENTS

| 2,542,376 | 2/1951 | Torresen | 85/5 R X |
| 2,804,798 | 9/1957 | Brilmyer | 85/5 R X |
| 3,094,017 | 6/1963 | Champoux et al. | 85/5 R X |
| 3,371,572 | 3/1968 | King | 85/7 |

Primary Examiner—Ramon S. Britts
Attorney, Agent, or Firm—Christensen, O'Connor, Johnson & Kindness

[57] ABSTRACT

A lockbolt collar configured to reduce the longitudinal tension in a lockbolt which otherwise has the effect of reducing its cross section, and hence the tightness of its fit where it passes through the secured parts, the longitudinal tension being caused by the swaging of the collar onto the lockbolt. An external taper of the collar toward its end adjacent the secured parts commencing at a location intermediate its ends provides a spatial cavity within the swaging die of sufficient size to receive collar material displaced during swaging and thereby significantly reduce the reverse flow of such collar material causing such longitudinal tension in the lockbolt.

16 Claims, 6 Drawing Figures

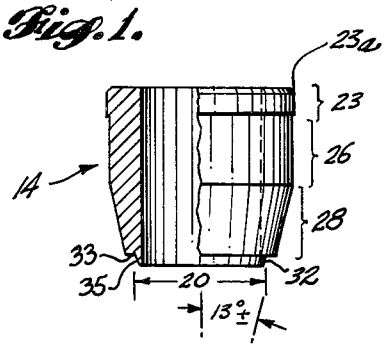
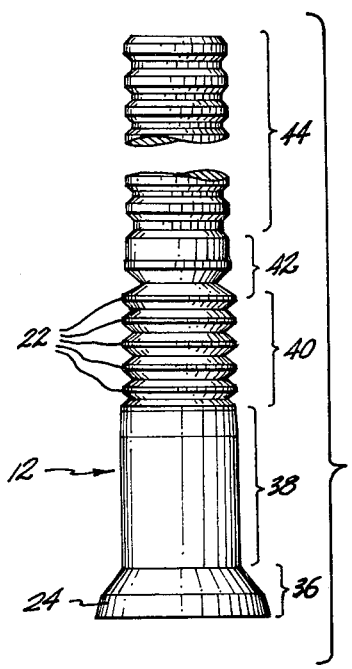
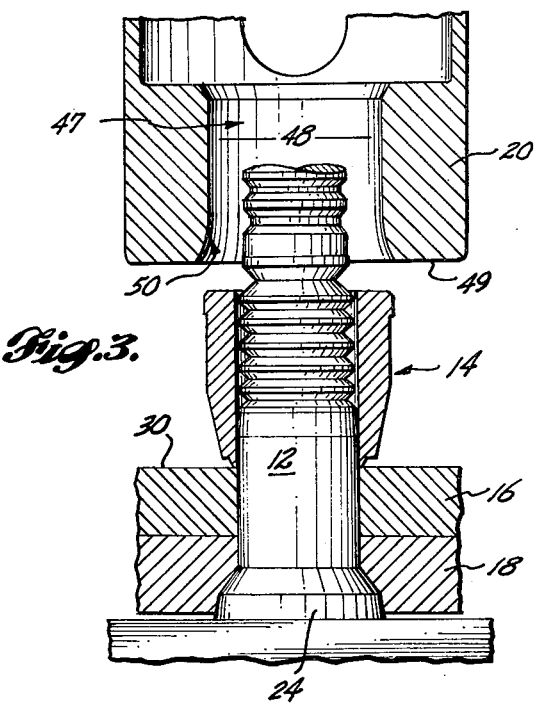
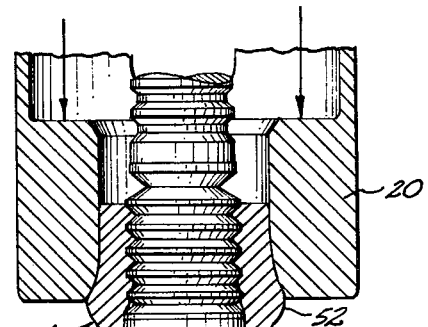
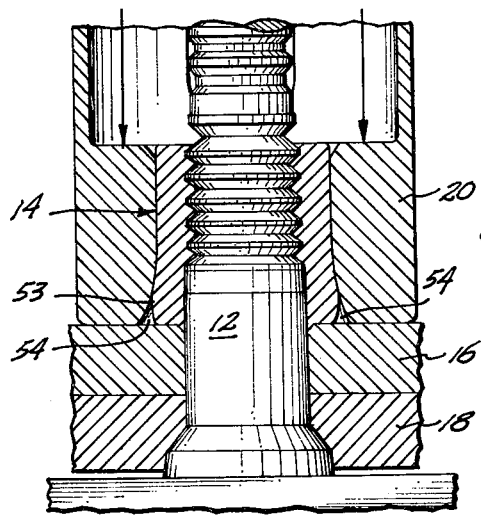
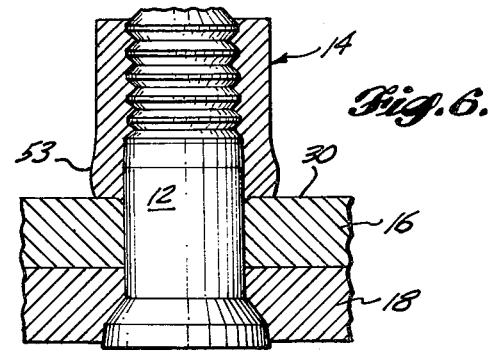

LOCKBOLT JOINT AND METHOD OF MAKING A LOCKBOLT JOINT

CROSS-REFERENCE TO RELATED APPLICATION

This is a continuation of application Ser. No. 614,774, filed Sept. 19, 1975, now abandoned, which in turn is a continuation of application Ser. No. 480,840 filed June 19, 1974, now abandoned, the benefit of the filing dates of which are hereby claimed under 35 USC 120.

BACKGROUND OF THE INVENTION

This invention relates generally to the lockbolt art, and more specifically concerns lockbolt collars which are used in combination with lockbolts to securely clamp two or more overlapped parts together.

Lockbolts are commonly used where high strength fasteners are required, such as in aircraft fuel tanks and aircraft cabins. Typically, a lockbolt collar is provided for use with a lockbolt which, when forced against the typically plate-like members forming the structure (e.g., fuel tanks or aircraft cabins) over that portion of the lockbolt which extends through the overlapped members and properly swaged to mate with a lockbolt, provides a reliable, high-strength fastener for the structure. Such a combination lockbolt and collar is disclosed in U.S. Pat. No. 3,094,017 to Champoux et al. In many such applications, an interference fit between the plate-like members and the lockbolt is required in order to insure the necessary tightness of the joint between the members and the lockbolt. To provide such an interference fit, the lockbolt itself is made slightly larger in diameter than the openings in the members through which the lockbolt is to fit. The lockbolt is forced through the openings, thereby slightly deforming the material in the members adjacent the openings to accommodate the lockbolt, and creating an extremely tight (i.e., fuel tight) interference fit between the members and the lockbolt. In many applications, it is essential that such an interference fit be created and maintained for proper operation of the structure in which it is used.

It has been discovered, however, that the tightness of the interference fit between a lockbolt and the members is reduced, and in some cases eliminated, during the process of swaging the collar onto the lockbolt. In many applications, this can lead to the rejection or failure of the structure in which the interference fit is used. The present invention is directed to a solution of this reduction in the tightness of the interference fit caused by the process of swaging.

In accordance with this invention, it has been discovered that the loss of interference fit is caused by a collar material flow phenomenon which occurs during the swaging process. After the collar is fitted over the lockbolt, and the swaging die is positioned adjacent the end of the collar farthest from the overlapped members, swaging begins by forcing the swaging die against the collar toward the plate members. During swaging, some collar material is forced into the annular grooves of the exposed ribs of the lockbolt, resulting in a secured mating of the collar and the lockbolt. The remainder of the collar material displaced by the swaging die, however, is displaced initially in the general direction of the end nearest of the secured members, and as swaging continues, the accumulating excess of collar material, upon reaching the nearest member, first flows radially inward toward the lockbolt, and then material adjacent the lockbolt tends to flow longitudinally of the lockbolt away from the secured members.

Typically, during the initial stages of swaging, the lockbolt is gripped by the swaging die and a sufficient longitudinal force is exerted on the lockbolt to securely clamp the two members together between the head of the lockbolt and the collar. As deformation of the material begins, the first lockbolt groove (i.e., that groove nearest the initially deformed end of the collar) is substantially filled by collar material, which has the effect of locking the lockbolt, the collar, and the overlapped parts together in that spatial position. At this point, the longitudinal tension force exerted on the lockbolt by the swaging die itself is preferably released, and deformation of the collar is continued. The longitudinal tension exerted on the lockbolt solely by the swaging process is sufficient to produce the reverse material flow phenomenon, and subsequent elongation of the lockbolt.

In accordance with the above, it is an object of the present invention to provide a lockbolt which overcomes the adverse effects of the prior art lockbolt collars described above.

More specifically, it is an object of the present invention to provide a lockbolt collar, which, when swaged to mate with a lockbolt will not cause a loss of interference fit between the lockbolt and the parts which are being clamped by the lockbolt and collar combination.

It is another object of the present invention to provide a lockbolt collar, which, when swaged to mate with a lockbolt, will not result in an undesirable elongation and attendant cross-sectional reduction of the lockbolt.

It is a further object of the present invention to provide a lockbolt collar which, when swaged to mate with a lockbolt, results in the accumulating excess collar material being left in the vicinity of the near member rather than being forced in a reverse flow back along the lockbolt.

SUMMARY OF THE INVENTION

According to the invention, a lockbolt collar of swageable material, such as an alloy of aluminum in the case of aircraft fabrication, is provided for use with a lockbolt to clamp together a plurality of parts which have aligned openings therein so that a ribbed portion of the lockbolt may be passed therethrough. A swaging die having a cavity therein defined by a cavity wall which opens on one end of the die is used to accomplish the swaging. The collar is generally ring-like in shape, having a central, generally straight axial bore which extends between two opposed ends of the ring-like collar, which permits the ribbed portion of the lockbolt to be passed therethrough. The ring-like collar has a radial thickness which varies along the length thereof, the collar including a tapered region along its length, in which region the thickness of the collar decreases in the direction of the one opposed end of the collar which is presented adjacent the parts during swaging. The tapered region is so configured and arranged relative to the cavity wall of the swaging die as the swaging die is driven towards the parts over the grooved portion of the lockbolt as to accommodate the swageable material displaced in the direction of the one opposed end during swaging that movement of material away from the parts during swaging tending to excessively tension the lockbolt and loosen its cross-sectional fit in said parts is prevented.

More specifically, the tapered region extends from substantially midway between the ends of the collar to substantially the end thereof abutted to the secured members and preferably has a uniform taper. In the preferred embodiment, the uniform taper is substantially within the range of 8 degrees and 18 degrees.

DESCRIPTION OF THE DRAWINGS

FIG. 1 is a side view of the collar of the present invention in its preferred form with part of the collar removed to show its cross section.

FIG. 2 is a side view of a lockbolt which may be used in combination with the collar of the present invention.

FIG. 3 is a side view partly in section showing the combination of the lockbolt and the collar assembled with a pair of plate members and a swaging die poised to begin swaging of the collar.

FIG. 4 is a view similar to FIG. 3 with the swaging of the collar at an intermediate stage, showing the partial deformation of the collar which occurs at a point during the process of swaging.

FIG. 5 is a view similar to FIG. 4 showing the swaging process completed.

FIG. 6 shows the combination of the lockbolt and the collar with a pair of plate members after swaging the collar is completed, the tip of the bolt being removed.

DESCRIPTION OF THE PREFERRED EMBODIMENT

Referring to FIGS. 1–3, the combination of a lockbolt 12 and a collar 14 may be preferably used to tightly clamp together overlapped plate-like members 16 and 18 in various special purpose structures such as aircraft fuel tanks and cabins. In such applications, it is necessary that lockbolt 12 and members 16 and 18 mate in an interference fit, in which the openings in the members 16 and 18, through which the lockbolt extends, are made slightly smaller than the diameter of the lockbolt. The lockbolt is forced through the slightly smaller openings, thereby deforming the member material adjacent the openings, and resulting in an extremely tight (i.e., fuel or air tight) fit between the lockbolt and the members. To accomplish and maintain the tight clamping of members 16 and 18, collar 14 is swaged or deformed onto that portion of the lockbolt 12 which protrudes immediately beyond plate 16. The swaging process is accomplished by a specially configured swaging die 20. Swaging die 20 is typically an elongated, rigid block of material in which is defined a cavity 47 communicating with one end 49 thereof, the cavity having a substantially constant diameter or bore 48, except for a flared entrance portion 50. The cavity is sufficiently deep to receive the entire length of the protruding portion of the lockbolt, and the diameter 48 is selected so as to be slightly smaller than the diameter of the collar, so that the collar is deformed when the swaging die is forced in the direction of the plate members.

In operation, swaging die 20 initially forces the collar 14 firmly against plate 16 by gripping the lockbolt and drawing the lockbolt outwardly, thereby compressing the members 16 and 18 between the lockbolt head and the lockbolt collar. As the swaging tool is driven in the direction of member 16, the initial portion of the collar 14 is deformed so as to mold it around the first circumferential groove and rib of the lockbolt, which has the effect of locking the collar in that position to the lockbolt. At this point, the longitudinal tension exerted directly on the lockbolt by the swaging die is terminated, and swaging continues with the swaging tool being driven towards member 16, resulting in further deformation of the material and the molding thereof around the remainder of the ribs and circumferential grooves of the lockbolt, until the end 49 of the swaging die is adjacent the member 16.

In the prior art, this swaging process has caused a slight elongation of the lockbolt, on the order of 30/1000 to 40/1000 of an inch for a collar similar to that disclosed in U.S. Pat. No. 2,955,505, with consequent reduction of lockbolt diameter where it passes through members 16 and 18. Collars of slightly different configuration produce either slightly greater or slightly lesser resulting lockbolt elongations depending on the amount of material displaced in the swaging process. In accordance with the invention, it has been discovered that this elongation and reduction of lockbolt diameter is due to a reverse material flow phenomenon caused by the process of swaging, as explained in detail above.

Referring now in detail to FIG. 1, showing an illustrative embodiment of the invention, collar 14 is shown having a configuration which significantly reduces or eliminates the reverse material flow phenomenon, and substantially eliminates the stretching or elongation of the lockbolt and its reduction in diameter. The collar 14 is preferably made from a high-strength aluminum alloy, although other materials such as steel, titanium, or monel may also be used. The collar 14 is in the general shape of a ring having a bore or interior diameter 20 of a dimension to fit closely over the projecting annular ribs 22 of lockbolt 12. At one end of collar 14 is a narrow annular ring 23 which has a diameter slightly greater than any other portion of the collar, the annular ring extending radially outward from but being integral with the collar 14. One side 23a of the annular ring is slightly relieved to facilitate the initial contact between the collar 14 and the interior wall of the swaging die 20 at the flared entrance 50 thereof. Annular ring 23 is known in the art as a clamp-up ring, and due to the additional amount of material thereby provided in the direction of swaging, provides a high initial resistance to swaging as compared with the remainder of the collar. The resistance to swaging of the enlarged portion of the collar formed by the external annular ring, as measured by the amount of force exerted on the swaging die necessary to initiate deformation of the collar, is determined by both the external diameter of the annular ring 23 relative to the remainder of the collar, and the longitudinal dimension or thickness of the annular ring at its base. Increasing either one of these dimensions will increase the force necessary for initiation of deformation of the collar.

Located longitudinally adjacent the annular enlargement or ring 23 is a cylindrical portion 26 of uniform diameter, the cylindrical portion 26 extending to approximately the longitudinal midpoint of collar 14, for reasons to be discussed hereinafter. The diameter of cylindrical portion 26 is slightly smaller than the diameter of annular ring 23.

At the other end of the collar is an annular sealing rib 32, which projects longitudinally of the collar from the end face 33 thereof. Briefly, the internal periphery of the rib 32 is a continuation of bore 20. The outer surface 35 of the rib 32 is a conic surface which tapers from the collar end face 33 to a circular (edge) intersection with the inner periphery of the rib 32. The rib 32 helps to provide a fuel-tight seal between the end of the collar, and the immediately adjacent surface 30 representing the rim of the lockbolt aperture in the adjacent member 16 as disclosed in U.S. Pat. No. 3,094,017. It is known that without the sealing ring a substantial percentage (e.g., on the order of 10 percent) of otherwise adequately clamped members, may permit leakage of fluids due to scratches or imperfections in either the end surface 33 or the collar or the immediately adjacent surface 30 of the nearest member being secured. Thus, the presence of rib 32 helps to insure the fluid tightness of the fit between the lockbolt and the secured members.

During swaging, when members 16 and 18 are initially compressed between the head of the lockbolt and the collar 14, the annular ring 32 is deformed immediately to fill in any cracks or imperfections in the two adjacent surfaces 33 and 30 and any opening between member 16 and lockbolt 12. The preferred angle between the conic surface and the axis of the collar 14 depends upon the size of the collar, and will typically vary from 20 degrees to 80 degrees as the collar increases from 3/16 inch diameter. Similarly, the external diameter of the rib 32 where it begins to project from the end face 33 and its projecting length beyond the end face 33 will depend upon the diameter of the lockbolt and the collar. As an example, for a lockbolt having a diameter of 3/16 inch, the axial projection of the rib is preferably between 1/64 inch and 1/32 inch. The function of and criteria for selecting the dimensions of the sealing ring 32 are the subject of U.S. Pat. No. 3,094,017 to Champoux et al, assigned to the same assignee as the present invention.

Between the cylindrical portion 26 and end face 33 the collar has an externally tapered region 28. The dimensional criteria of the tapered region 28 are determined generally by the amount of cavity space defined between the tapered exterior surface of the collar 14 and the internal wall of the swaging die 20 necessary to accommodate collar material displaced during swaging so as to prevent the aforementioned reverse flow effect in accordance with this invention. Thus, the selection of the point longitudinally of the collar where the taper begins, the point where the taper ends, and the angle or configuration of the taper are determined by the basic criteria that a spatial cavity must be provided which is sufficiently large to receive or pocket substantially all of the excess transitory material displaced in the direction of member 16 during the swaging process.

If the spatial cavity is not large enough, the excess material fills up the cavity and then flows radially inward of the lockbolt ultimately forcing longitudinal reverse material flow along the lockbolt away from parts 16 and 18 so as to create the undesired tension in the lockbolt which shrinks its diameter and loosens its fit in the parts 16 and 18. However, the location and configuration of the taper must not eliminate so much collar material as to create a deficiency precluding substantial filling of all of the circumferential grooves between ribs 22 formed on the lockbolt 12. If the taper begins too far from the collar end engaging member 16, not enough collar material will be present in the body at the collar to sufficiently fill the grooves nearest member 16.

It is possible that the external taper of the collar may be given a longitudinally convex or concave form while meeting the above mentioned requirements. For reasons of simplicity, minimum cost and effective results, however, a straight taper is preferred, extending from between approximately the longitudinal midpoint of the collar to the end face 33. The taper angle relative to the longitudinal center line of the collar is preferably on the order of 13 degrees, ±5 degrees, as shown in FIG. 1. Within this range, a spatial cavity is provided which permits sufficient volumetric expansion of the collar in the vicinity of the end of the collar adjacent the member 16 from the flow of excess collar material, while still providing sufficient collar material to fill in at least a substantial portion of each of the circumferential grooves of lockbolt 12 sufficient to securely lock the collar 14 to the lockbolt 12.

The collar 14 is adapted to be swaged onto a lockbolt such as that shown in FIG. 2. The lockbolt shown specifically in FIG. 2 is of a configuration disclosed in application Ser. No. 400,334, entitled "Wedge Head Pin Fastener", by Louis Champoux, and assigned to the same assignee as the present invention. Briefly, this lockbolt comprises successively in the longitudinal direction, a double angled head portion 36; a cylindrical shank portion 38; a securing portion 40 having successively spaced annular ribs 22 formed by circumferential grooves, and around which the collar 14 is to be swaged; a breakneck portion 42; and a gripping portion 44. The gripping portion permits the lockbolt to be securely held during swaging, and the breakneck portion permits the gripping portion to be broken off after swaging is completed.

The sequence of the swaging process is shown in FIGS. 3–6. The collar 14 is initially positioned over the securing portion 40 of the lockbolt 12. Members 16 and 18 are then pulled tightly together by the action of the swaging die 20 compressing them between collar 14 and the imbedded head portion 36 of lockbolt 12. The bore 48 of swaging die 20 has a flared entrance 50 addressed to the collar 14. The bore 48 at the end 49 of die 20 is larger than the diameter of the annular ring 23 of collar 14, and thus, side 23a of annular ring 23 at the one end of collar 14 will mate with the periphery of the bore 48 at some point along the flared entrance 50. Behind the flared entrance 50, the bore 48 reduces to a diameter which is slightly less than the diameter of the cylindrical portion 26, so that as the swaging die is driven toward the plate member 16, the collar 14 is gradually deformed along its longitudinal dimension and molded to the ribs 22 of the securing portion 40 by the continued advancement of the swaging die 20.

A substantial amount of collar material is forced immediately inward of the collar, filling in around the annular rings 22 of the lockbolt in the circumferential grooves thereof, with the excess collar material being forced toward near member 16. As swaging proceeds, the amount of excess material being moved gradually decreases because of the presence of taper portion 28. The spatial cavity created between the decreasing exterior diameter of the collar 14 in the tapered region 28 relative to the flared entrance 50 of cavity 47 provides room for the accommodation of collar material which is being displaced toward plate 16. A peripheral bulge 52 of collar material accumulates at the flared entrance 50 to cavity 47 during swaging, which bulge gradually decreases in volume as swaging proceeds because the increasing accommodation of excess collar material by tapered region 28.

When swaging has been completed, as shown in FIGS. 5 and 6, there will typically be a slight peripheral bulge 53 in the vicinity of that end of the collar presented immediately adjacent member 16. Referring specifically to FIG. 5, the tapered region 28 is configured relative to the bore 48 of swaging die 20 such that at completion of swaging, with the swaging die end 49 contacting surface 30 of member 16, there will remain a small volume of space 54 between surface 30, the flared entrance 50 of swaging die 20, and the surface of the collar. The provision for such a volume of space insures that substantially all transitory material has been accommodated by the spatial cavity. FIG. 6 shows a lockbolt and collar combination after swaging has been completed, illustrating the peripheral bulge 53, and wherein the gripping portion 44 of the lockbolt has been preferably broken off at the breakneck portion 42.

By thus providing a lockbolt collar with a tapered region extending from substantially the longitudinal midpoint of the collar to the collar end adjacent the overlapped plate members, excess collar material accumulated during swaging flows continually in the direction of the plate members instead of proceeding radially inward toward the lockbolt in the vicinity of plate members and then away from the plate members longitudinally of the lockbolt. The prevention of this reverse material flow prevents the lockbolt from being elongated, and hence preserves the original tight interference fit between the lockbolt and plate members.

Although an exemplary embodiment of the present invention has been disclosed herein for purposes of illustration, it will be understood that various modifications, changes and substitutions may be incorporated in such embodiment without departing from the spirit of the invention as defined by the claims which follow. For instance, it should be understood that the end rib portion and opposite external annular ring may take various configurations and may in some applications be eliminated. Furthermore, it should be understood that the configuration of the tapered region, although shown in the preferred embodiment as a straight taper proceeding from substantially the longitudinal midpoint to one end of the collar, may take various other forms, as clarified above. It is important, however, that the configuration of the taper be such that a sufficient spatial cavity is provided for accommodation of the advancing excess material created incident to swaging.

What is claimed is:

1. A lockbolt joint comprising:
   a workpiece having an aperture therethrough;
   a lockbolt having a shank extending through and fitting snugly in said aperture and having a portion projecting outwardly beyond one surface of said workpiece;
   a lock collar swaged about said portion and having a final peripheral bulge adjacent said one surface, said final peripheral bulge having a converging portion which converges toward said one surface immediately adjacent said one surface, said final peripheral bulge being formed by swaging of a collar about said lockbolt with a swaging tool having an interior configuration which initially forces said collar into contact with said lockbolt and forms a transitory peripheral bulge of collar material at the end of said collar not adjacent said workpiece, and which forces said transitory bulge to be displaced progressively along the length of said collar as said collar is swaged into engagement with said lockbolt, the portion of said swaging tool immediately adjacent said one surface being sized to accommodate more than all said collar material therein upon engagement of said tool with said workpiece, thereby forming said final peripheral bulge, whereby longitudinal flow of said collar material in a direction away from said workpiece is minimized, thus preventing excessive tension on said lockbolt.

2. The lockbolt joint defined in claim 1 in which said portion has an annular lock rib spaced from said one surface, and said lock collar is swaged into intimate contact with said lock rib, securing said lockbolt and said lock collar against relative movement with respect to said workpiece.

3. The lockbolt joint defined in claim 1, wherein said collar before being swaged about said lockbolt has a generally ring-like shape and a central, generally straight axial bore which permits said portion of the lockbolt to be passed therethrough, said collar having a radial thickness varying along its length, including a tapered region in which said radial thickness decreases in the direction of said one surface, said tapered region being so contoured relative to said interior configuration of said swaging tool to accommodate said collar material therein when said tool engages said one surface.

4. The lockbolt joint defined in claim 3, wherein said tapered region extends from substantially the longitudinal midpoint of said collar to substantially the end thereof abutted to said one surface of said workpiece.

5. The lockbolt joint defined in claim 4, wherein said tapered region forms a substantially uniform taper over its length.

6. The lockbolt joint defined in claim 5, wherein said uniform taper is substantially within the range of 8 degrees to 18 degrees.

7. A method of making a lockbolt joint wherein a swaging tool is used to swage a lock collar onto an end portion of a lockbolt protruding through an aperture in a workpiece, comprising the steps of:
   fitting the shank of said lockbolt snugly through said aperture in said workpiece so that said end portion of said shank projects beyond one surface of said workpiece;
   placing said lock collar over said end portion of said shank, and;
   applying a swaging force with said swaging tool to said lock collar, said swaging tool having an interior configuration which initially forms a transitory peripheral bulge of collar material upon being forced over said lock collar toward said workpiece, the portion of said interior configuration closest to said workpiece being sufficiently large to accommodate more than all of said collar material contained therein when said tool engages said workpiece, said force being applied in the direction toward said workpiece until said swaging tool engages said one surface of said workpiece, said swaging tool thereby causing said transitory peripheral bulge to be initially formed at the end of said lock collar spaced from said workpiece and to be displaced progressively along the length of said lock collar towards said one surface of said workpiece, said swaging tool upon engaging said one surface of said workpiece thereby forming a final peripheral bulge having a converging portion which converges toward said one surface immediately adjacent said one surface, longitudinal flow of said lock collar material in a direction away from said workpiece thereby being minimized and excessive longitudinal tension on said lockbolt thereby being prevented.

8. The method of claim 7 wherein said collar, prior to being swaged about said lockbolt, has a generally ring-like shape and a central, generally straight axial bore which permits said portion of the lockbolt to be passed therethrough, said collar having a radial thickness varying along its length and including a tapered region in which said radial thickness decreases in the direction of the collar adjacent said one surface, said tapered region being so contoured relative to said interior configuration of said swaging tool as to accommodate said collar material therein when said tool engages said one surface.

9. The lockbolt joint defined in claim 8 wherein said tapered region extends from substantially the longitudinal midpoint of said collar to substantially the end thereof abutted to said one surface of said workpiece.

10. The lockbolt joint defined in claim 9 wherein said tapered region forms a substantially uniform taper over its length.

11. The lockbolt joint defined in claim 10 wherein said uniform taper has a taper angle relative to the longitudinal centerline of the collar substantially within the range of 8 degrees to 18 degrees.

12. A lockbolt joint comprising:
a workpiece having an aperture therethrough;
a lockbolt having a shank extending through and fitting snugly in said aperture and having a portion projecting outwardly beyond one surface of said workpiece;
a lock collar swaged about said portion and having a final peripheral bulge adjacent said one surface, said final peripheral bulge having a converging portion that converges toward said one surface immediately adjacent said one surface, said peripheral bulge having accumulated collar material moved at least in part axially by a swaging die during swaging, said swaging die being sized to accommodate said collar material therein without substantial axial flow of said collar material away from said one surface when the forward end thereof engages said one surface at the end of a swaging stroke.

13. The lockbolt joint of claim 12 wherein said lock collar prior to swaging has a generally ring-like shape and a central, generally straight axial bore which permits said portion of the lockbolt to be passed therethrough, said collar having a radial thickness varying along its length, including a tapered region in which said radial thickness decreases in the direction of the collar adjacent said one surface.

14. The lockbolt joint defined in claim 13 wherein said tapered region extends from substantially the longitudinal midpoint of said collar to substantially the end thereof abutted to said one surface of said workpiece.

15. The lockbolt joint defined in claim 14 wherein said tapered region forms a substantially uniform taper over its length.

16. The lockbolt joint defined in claim 15 wherein said uniform taper has a taper angle relative to the longitudinal centerline of the collar substantially within the range of 8 degrees to 18 degrees.

* * * * *